United States Patent [19]

Sexton et al.

[11] Patent Number: 5,068,821
[45] Date of Patent: Nov. 26, 1991

[54] BIT PROCESSOR WITH POWERS FLOW REGISTER SWITCHES CONTROL A FUNCTION BLOCK PROCESSOR FOR EXECUTION OF THE CURRENT COMMAND

[75] Inventors: Daniel W. Sexton, Charlottesville, Va.; William F. Bentley, Ft. Collins, Colo.

[73] Assignee: GE Fanuc Automation North America, Inc., Charlottesville, Va.

[21] Appl. No.: 329,151

[22] Filed: Mar. 27, 1989

[51] Int. Cl.[5] .......................... G06F 9/46; G06F 15/16
[52] U.S. Cl. .................................. 395/800; 364/931.1; 364/931.49; 364/931.44; 364/947; 364/949; 364/942.8; 364/933.2; 364/228.6; 364/259; 364/259.9; 364/244.6; 364/131; 364/DIG. 1; 364/DIG. 2
[58] Field of Search ... 364/200 MS File, 900 MS File, 364/131-133

[56] References Cited

U.S. PATENT DOCUMENTS

| | | | |
|---|---|---|---|
| 4,491,908 | 1/1985 | Woods et al. | 364/200 |
| 4,663,704 | 5/1987 | Jones et al. | 364/900 |
| 4,703,414 | 10/1987 | Inoue et al. | 364/900 |
| 4,835,773 | 5/1989 | Kuwahara et al. | 371/8.1 |
| 4,894,768 | 1/1990 | Iwasaki et al. | 364/200 |
| 4,901,274 | 2/1990 | Maejima et al. | 364/900 |
| 4,914,578 | 4/1990 | MacGregor et al. | 364/200 |
| 4,926,318 | 5/1990 | Nakayama | 364/200- |

FOREIGN PATENT DOCUMENTS 61-81007 7/1986 Japan .

Primary Examiner—Thomas C. Lee
Assistant Examiner—Mehmet Geckil
Attorney, Agent, or Firm—James H. Beusse

[57] ABSTRACT

A programmable logic controller is provided which includes a function block processor for processing function block instructions and a bit processor for processing Boolean instructions. The bit processor decodes and identifies the OPCODE of each instruction command in a user program memory and returns control to the function block processor if at least one of the following two conditions occurs, namely, 1) there is power flow in the power flow register of the bit processor and 2) the function block is one which must be executed by the function block processor. The bit processor waits until the function block processor has retrieved the instruction pointer from the bit processor and then adjusts the instruction pointer to point to the next OPCODE in the user program memory.

8 Claims, 3 Drawing Sheets

| ADDRESS | OPCODE (MNEMONIC) OR OPERAND | OPCODE/OPERAND OBJECT CODE | |
|---|---|---|---|
| | | IN7-4 | IN3-0 |
| ADDRESS 1 | LOAD A | 0001 | 1010 "A" |
| ADDRESS 2 | 42H | 0100 "4" | 0010 "2" |
| ADDRESS 3 | FUNC | 1000 | BCCC |
| ⋮ | | | |
| RESUME ADDRESS | | | |

BIT PROCESSOR WITH POWERS FLOW REGISTER SWITCHES CONTROL A FUNCTION BLOCK PROCESSOR FOR EXECUTION OF THE CURRENT COMMAND

BACKGROUND OF THE INVENTION

This invention relates in general to programmable logic controllers for use in controlling manufacturing, industrial and other processes. More particularly, the invention relates to a programmable logic controller employing a main function block processor and an auxiliary bit processor.

BRIEF SUMMARY OF THE INVENTION

Programmable logic controllers are a relatively recent development in process control technology. As a part of process control, a programmable logic controller is used to monitor input signals from a variety of input sensors which report events and conditions occurring in a controlled process. For example, a programmable logic controller can monitor such input conditions as temperature, pressure, volumetric flow and the like. A control program is stored in a memory coupled to the programmable logic controller to instruct the programmable logic controller what actions to take upon encountering particular input signals or conditions. In response to these input signals, the programmable logic controller derives and generates output signals which are transmitted to various output devices to control the implementation of the process. For example, the programmable logic controller issues output signals to open or close a microswitch, raise or lower temperature and pressure, or control the speed of a conveyer, as well as many other possible control functions too numerous to list.

Contemporary programmable logic controllers include a central processing unit (CPU) for processing the various instructions of the control program. The control program is stored in a memory coupled to the CPU and contains instructions which tell the CPU what output signals to send to control devices in response to various input signals received by the CPU from input sensors. Generally, an input/output (I/O) system is disposed between the CPU and the input sensors and control devices.

In more advanced programmable logic controllers, a two processor architecture is employed. That is, the programmable logic controller includes a function block processor or main processor for executing high order instructions known as function blocks. The programmable logic controller further includes a bit processor or coprocessor which executes low level instructions known as Boolean instructions in an accelerated fashion. In such processor-coprocessor programmable logic controllers, the user program is generally stored in a memory which is accessible to both the function block processor and the bit processor. The user program includes both function block instructions and Boolean instructions all mixed together. One task of both processors is to coordinate and share the execution of the user program. That is, the instructions or commands of the user program in memory are serially executed and either the function block processor or the bit processor is selected to execute a particular instruction depending upon whether the instruction is a function block or a Boolean instruction.

One example of such a two processor architecture for a programmable logic controller is shown in FIG. 1. The programmable logic controller of FIG. 1 includes a main bus to which an input unit 1, an output unit 2 and a programming console 3 are coupled. A work memory 4, read only memory (ROM) 5, function block processor (main processor) 6 and a bit processor 7 are also coupled to the main bus. A multiplexer 8 is coupled between a user memory 9 and bit processor 7. Another multiplexer 10 is coupled between an input/output (I/O) memory 11 and bit processor 7. A start line and an interrupt line (IRQ) interconnect function block processor 6 and bit processor 7. In this architecture, bit processor 7 takes control and decodes user commands in the user program stored in user memory 9. When bit processor 7 encounters a Boolean instruction (also known as a low level instruction or a basic command) bit processor 7 processes the Boolean instruction using its own operating circuits. In contrast, when bit processor 7 decodes and detects a function block instruction (also known as a high level instruction or an application command) bit processor 7 relinquishes control to function block processor 6 which then processes the function block instruction.

Bit processor 7 in the above described two processor architecture includes a command decoder which decodes commands in the user program in memory 9. A portion of each user command or instruction in memory 9 is address converted by an address converter within bit processor 7. Data at the selected converted address in I/O memory 10 is then accessed and provided to logic and operating circuits which manipulate the data and provide the operation result to a power flow register within bit processor 7. That is, the data at the selected address in I/O memory 11 is accessed, manipulated and becomes the content of the power flow register.

Bit processor 7 includes a program counter which is adjusted each time a command is decoded. Thus, after each command is processed, the program counter points to the address of the next command of the user program in user memory 9 which is to be executed. A series of successive commands in the user program may thus be processed.

In the case where the command decoder within bit processor 7 determines that a particular command in the user program is a function block command, an interrupt signal (IRQ) is sent to function block processor 6. This transfers control to function block processor 6 for purposes of processing the current function block command. It is noted that in one typical known two processor architecture, once a function block command is decoded, processing control is transferred to function block processor 6 with no preconditions, that is, regardless of whether the prior content of the power flow register in bit processor 7 contains a "0" or a "1". It is noted that when a function block command is executed by function block processor 6, a relatively large amount of time is consumed, typically in the range of approximately 10 to 100 times longer than required for the execution of a Boolean instruction by bit processor 7. Thus, when function block commands are employed in user programs in this architecture, the execution cycle time is relatively long which results in significant undesirable delay. One relatively recent two processor programmable logic controller is described in Japanese Patent Application 61-181007 filed July 31, 1986 by Tetsuo Doi et al. for a "Programmable Controller"

which is assigned to Tateishi Denki K. K. The Doi et al. programmable logic controller includes both a function block processor and a bit processor. The bit processor decodes the commands contained in a user program stored in user memory. Upon finding a function block OPCODE or command in the user program, the bit processor identifies the function block code and performs a NOOP (No Operation) operation around the OPCODE if there is zero power flow in the power flow register of the bit processor. That is, in this instance, no interrupt is provided to the function block processor such that the function block is NOP processed by the bit processor itself without coming under the control of the function block processor. As long as the value in the power flow register is not a "1", a command is NOOP processed by the bit processor even if it is a function block command. In this manner, the execution of the command is effectively shortened as compared with its execution time when it is always processed by the function block processor.

Unfortunately, although this approach does increase the effective operating speed of the programmable logic controller somewhat, it exhibits the disadvantage that no function blocks can be constructed which require execution during times when there is no power flow. Moreover, no function blocks can be created which have more than one Boolean output or one Boolean input since no manipulation is done to the power flow register or the associated bit stack when the function block is not executed. An additional limitation of this approach is that if a function block is executed, the program counter of the bit processor must be adjusted by the function block processor since the NOOP around the function block does not occur in this case. Such action requires a significant amount of time and adds undesired overhead to the processing of each function block which is executed.

BRIEF SUMMARY OF THE INVENTION

One object of the present invention is to provide a high performance programmable logic controller which includes both a function block processor and a bit processor.

Another object of the present invention is to provide a programmable logic controller which achieves high speed operation while reducing undesired operational overhead.

Yet another object of the present invention is to provide a programmable logic controller which solves the problems and limitations associated with the programmable logic controllers discussed above.

In accordance with the present invention, a programmable logic controller is provided including a bit processor for processing low level commands. The programmable logic controller further includes a user program memory, coupled to the bit processor, for storing user program commands therein at respective addresses, such commands containing OPCODES and having OPERANDS associated therewith. A function block processor is coupled to the bit processor for processing high level commands. The bit processor includes a power flow register and a program counter containing an instruction pointer to a command in memory designated the current command. The bit processor further includes a decoder for decoding and identifying the OPCODE of the current command and its associated OPERANDS in the user program memory. The bit processor accesses the current command in user program memory. The bit processor includes control means for relinquishing control to the function block processor if the present OPCODE signifies a function block and at least one of the following two conditions is true: 1) there is power flow in the power flow register of the bit processor, and 2) the function block is one which must be executed by the function block processor. The bit processor includes an instruction pointer adjuster which waits until the function block processor has retrieved the current instruction pointer value from the bit processor and then adjusts the instruction pointer to point to the next OPCODE in the user program memory. Such next OPCODE is now designated the current command.

BRIEF DESCRIPTION OF THE DRAWINGS

The features of the invention believed to be novel are specifically set forth in the appended claims. However, the invention itself, both as to its structure and method of operation, may best be understood by referring to the following description taken in conjunction with the accompanying drawings in which:

DETAILED DESCRIPTION OF THE INVENTION

Figure 2:
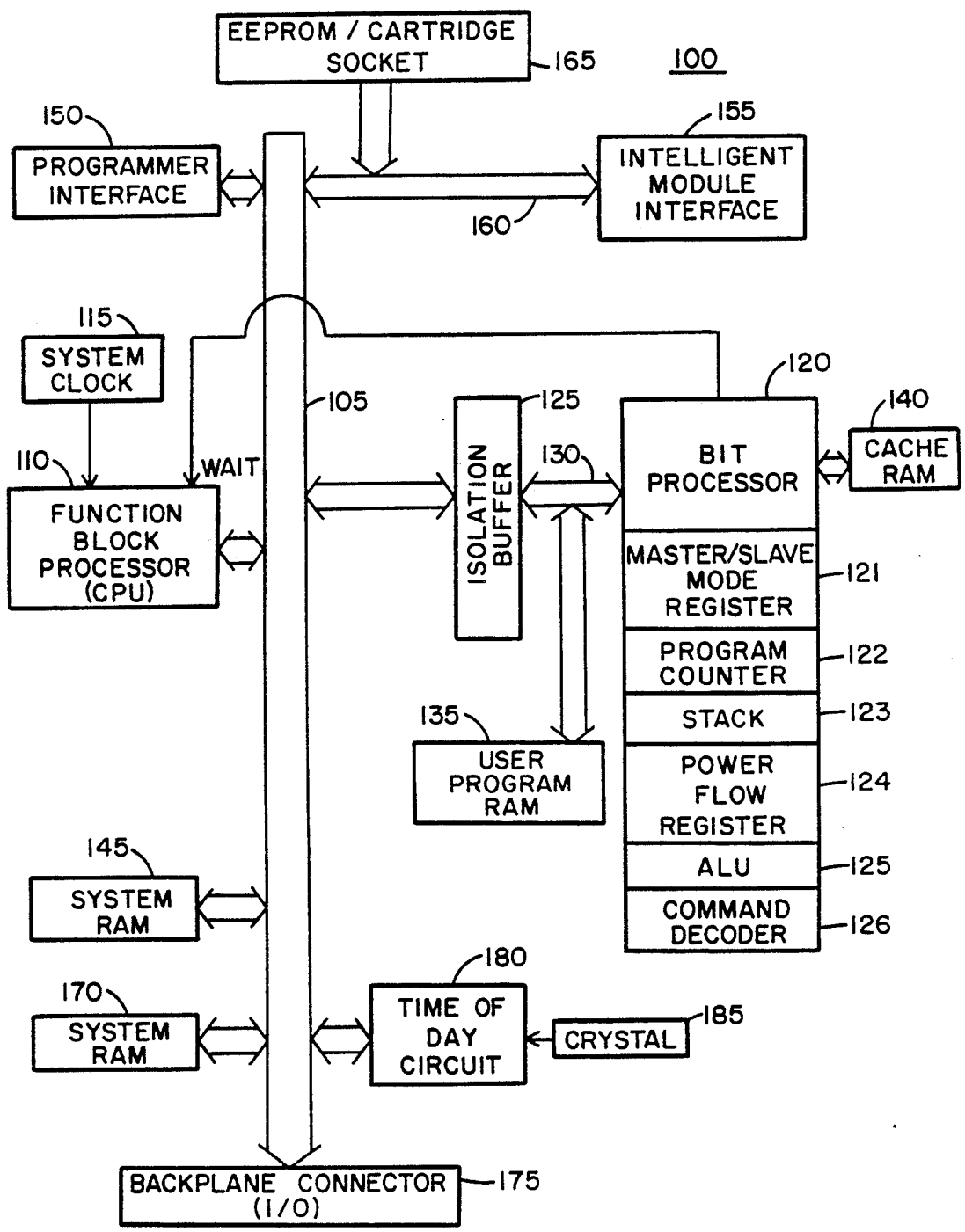
FIG. 2 is a block diagram of the programmable logic controller of the present invention.

FIG. 2 is a block diagram of the programmable logic controller of the present invention shown as programmable logic controller 100. Programmable logic controller 100 includes a main system bus 105 to which the various elements and devices which constitute programmable logic controller 100 are coupled to provide a communications path among such elements and devices. Programmable logic controller 100 further includes a function block processor 110 which is coupled to main system bus 105. Function block processor 110 is also referred to as the main processor or central processing unit (CPU) of programmable logic controller 100. A system clock 115 is coupled to function block processor 110 to provide a time base reference signal thereto.

A bit processor 120, also referred to as a coprocessor, is coupled via an isolation buffer 125 to main system bus 105. More specifically, bit processor 120 is coupled to isolation buffer 125 by a connecting bus 130. Bit processor 120 includes a master/slave mode register 121, program counter 122, bit stack 123, power flow register 124 and arithmetic logic unit (ALU) 125 and command decoder 126 which will be described later in more detail.

Programmable logic controller 100 includes a user program random access memory (RAM) 135 for storing a user program while programmable logic controller 100 is in operation. User program RAM 135 is coupled to connecting bus 130 such that function block processor 110, bit processor 120 and main system bus 105 are coupled to and have access to RAM 135. A cache memory 140 of relatively fast random access memory is coupled to bit processor 120 to enhance the operation thereof by storing recently executed instructions for immediate recall by bit processor 120.

A system RAM 145 is coupled to main system bus 105 to provide programmable logic controller 100 with temporary storage memory in addition to the temporary storage memory which user program memory 135 provides for the user program.

In a conventional manner, a programmer interface 150 is coupled to the main system bus 105 to provide a programmer with one way to program programmable logic controller 100. For example, in one embodiment programmer interface 150 is a keyboard/keyboard interface at which a programmer keys in instructions to programmable logic controller 100. Also in a known manner, an intelligent module interface 155 is coupled to main system bus 105 via a connecting bus 160. Intelligent module interface 155 provides another way in which the programmer or user can program programmable logic controller 100. That is, programmable logic controller 100 includes a socket 165, coupled to connecting bus 160, for receiving an EEPROM which contains a program in a program instruction module for programmable logic controller 100. A system programmable read only memory (PROM) or system PROM 170 is coupled to main system bus 105 as shown in FIG. 2. PROM 170 permanently stores the control program which controls the operation of programmable logic controller 100 and which causes controller 100 to perform as a programmable logic controller in the manner later described. The control program is to be distinguished from the already mentioned user program which programs programmable logic controller 100 with respect to which output signals to generate when presented with particular sensor input signals.

An input/output (I/O) backplane connector 175 is coupled to main system bus 105 to permit input sensors to be coupled to main system bus 105 and to couple main system bus 105 to the output devices to be controlled. The busses indicated in FIG. 2 by wide paths with an arrow on at least one end, for example bus 105, include address and data busses therein although not specifically shown.

A time of day circuit 180 is coupled to main system bus 105 to provide function block processor 110 and bit processor 120 with time of day information. A crystal 185 is coupled to time of day circuit 180 to provide a time base reference therefor.

Bit processor 120 is operable in two modes, namely a master mode and a slave mode. A master bit is written to master/slave mode register 121 to place bit processor 120 in the master mode. Alternatively, to place bit processor 120 in the slave mode, a slave bit is written to master/slave mode register 121 of the bit processor. When bit processor 120 is placed in the slave mode in this manner, function block processor 110 has control of user program RAM 135. When function block processor 110 desires to use bit processor 120, function block processor 110 writes a start command. Bit processor 120 then takes control of user RAM 135 by writing a master bit into the master/slave register. Concurrently, tristate buffers (not shown) are engaged to shut off function block processor 110 from the data and address busses connecting processor 110 to the remainder of programmable logic controller 100. Function block processor 110 is permitted to service interrupts and execute direct memory access (DMA) cycles in this mode. However, processor 110 is otherwise held in an inactive state by bit processor 120 asserting a WAIT signal on the WAIT signal line coupling bit processor 120 to function block processor 110 as shown in FIG. 2. In this master mode, function block processor 110 has no access to user program RAM 135.

When bit processor 120 is in the slave mode, function block processor 110 may directly access program counter 122 and stack 123 in bit processor 120. In this particular embodiment of the invention, program counter 122 is a 16 bit counter and stack 123 is 8 bits wide although the invention is not limited to the values set forth here merely for purposes of example. Additionally, when bit processor 120 is in slave mode, function block processor 110 may also access cache RAM 140.

Figure 3:
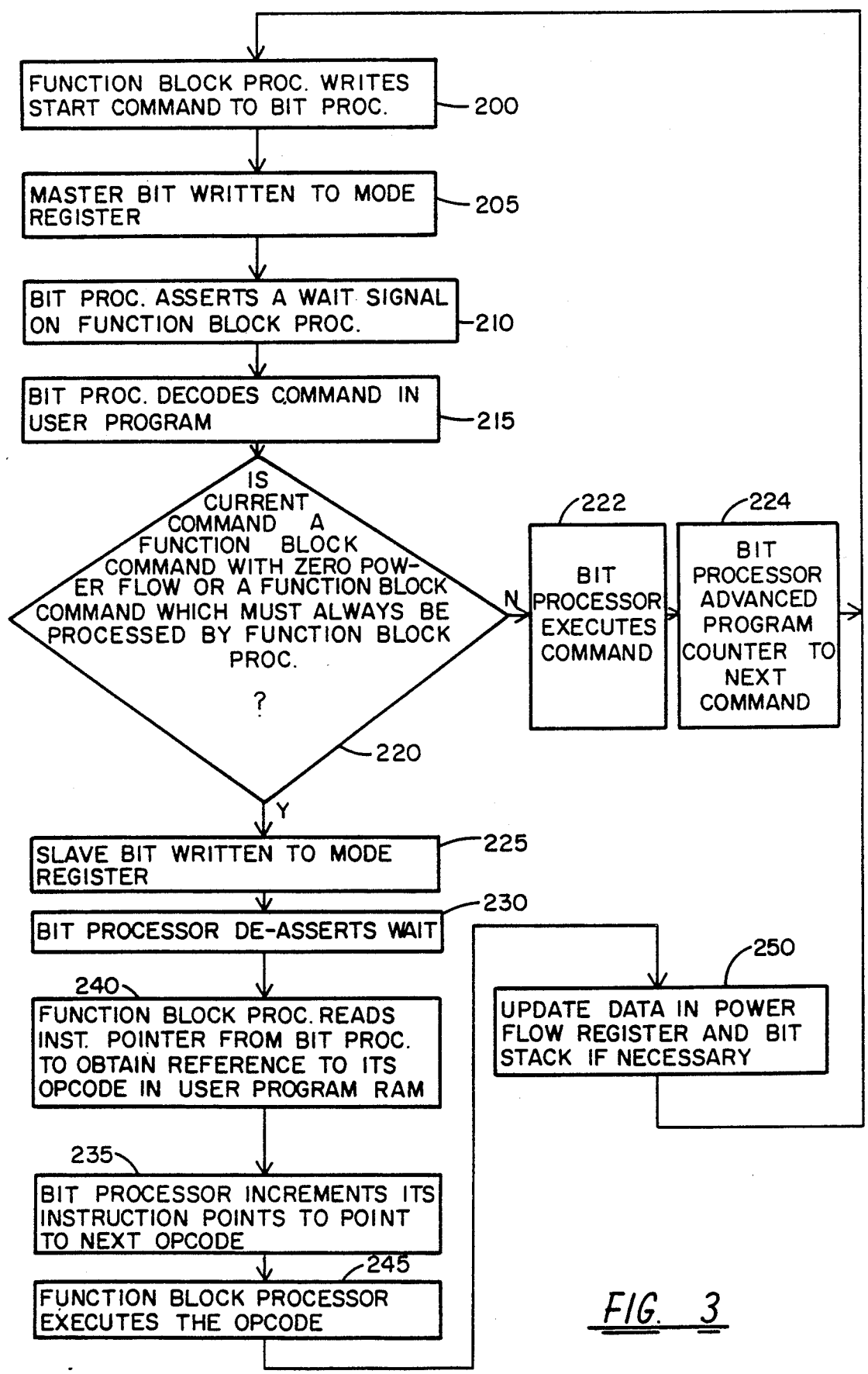
FIG. 3 is a flowchart of the operation of the bit processor of the invention in a master mode.

The operation of bit processor 120 in master mode is now discussed in more detail through reference to the operational flow chart of the master mode shown in FIG. 3. To initiate the master mode, function block processor 110 writes a start command to bit processor 120 as per block 200. A master bit is then written to master/slave mode register 121 as per block 205. Once this starting operation is performed, bit processor 120 isolates itself from function block processor 110 and asserts a WAIT signal on the WAIT line as per block 210. In response to the WAIT signal, function block processor 110 then executes an instruction which causes the function block processor to wait until bit processor 120 removes or de-asserts the WAIT signal. That is, function block processor 110 is permitted to respond to interrupts, but is forced to return to waiting once servicing of the interrupts is complete.

Bit processor 120 decodes a command in user program RAM 135 as per block 215. If at decision block 220 a determination is made that the current command is not a function block command with zero power flow or is not a function block command of the type having an OPCODE which must be processed by function block processor, then bit processor 120 executes the current command as per block 222. At block 224, bit processor 120 then advances the program counter 122 to point to the next command. Flow then continues back to block 200. However, if at descision block 220 a determination is made that the current command is a function block command with zero power flow or a function block command of the type having an OPCODE which must be processed by function block processor, then flow continues to block 225 at which a slave bit is written to mode register 121. This action returns bit processor 120 back to the slave mode. Bit processor 110 also de-asserts the WAIT signal to return control to function block processor 110 as per block 230. The function block processor 110 then reads the instruction pointer from bit processor 120 and thus is provided a reference to its OPCODE in user program RAM 135 as per block 240. It is noted that the OPCODE of the current command has no meaning to function block processor 110. However, the information following the OPCODE does have meaning to function block processor 110. Bit processor 120 then increments or otherwise adjusts program counter 122 to point to the address in user program RAM 135 of this next OPCODE as per block 235 thus updating an instruction pointer.

At this point, function block processor 110 is free to interrogate and modify any data in bit stack 123 or power flow register 124. Function block processor executes the OPCODE as per block 245. Upon completion of the function block, function block processor 110 updates bit stack 123 and power flow register 124 as per block 250 if necessary. Flow then continues back to block 200 to repeat the process. It is noted that as a result of the above described operations, the pointer in program counter 122 is automatically pointing to the correct address in user program memory 135 to access the next command or instruction and that not further updating of program counter 122 is necessary before proceeding to process the next command or instruction.

Figures 1, 4:
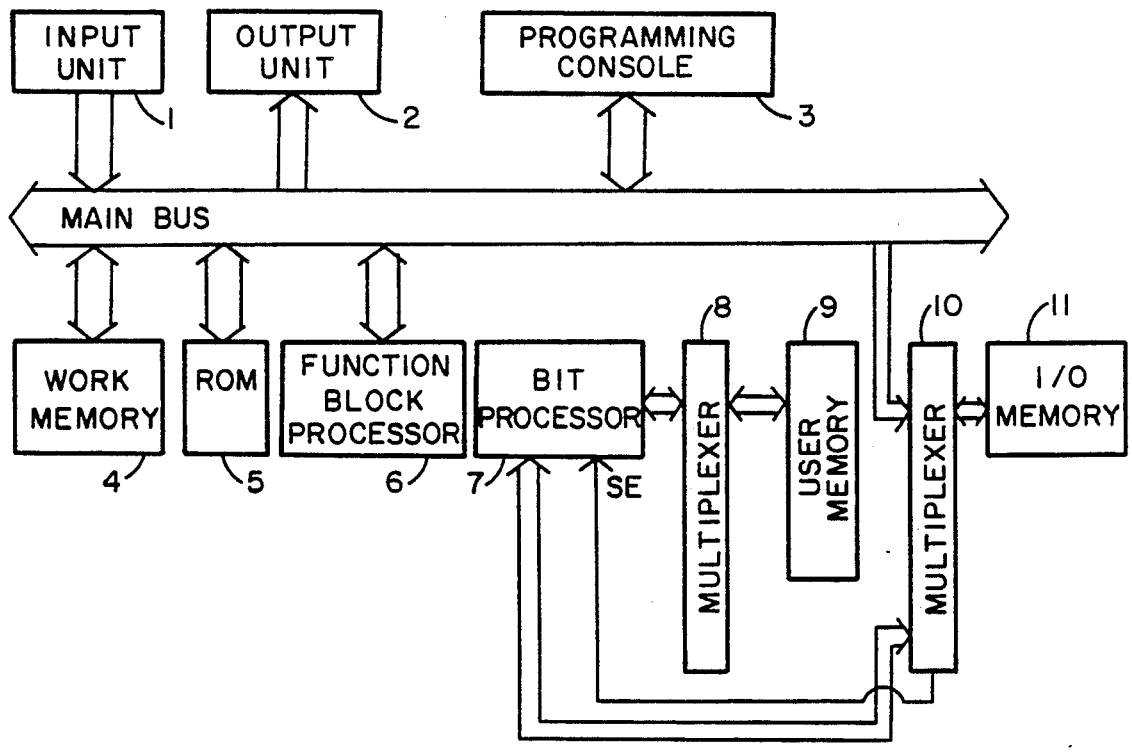
FIG. 1 is a block diagram of a conventional two processor programmable logic controller.
FIG. 4 is a memory map of a portion of a user program stored in a user program memory in the programmable logic controller of the present invention.

FIG. 4 shows a memory map of a portion of a sample user program stored in user program RAM 135. The leftmost column contains sample sequential memory addresses in RAM 135 which for convenience are labeled ADDRESS 1, ADDRESS 2, ADDRESS 3, ADDRESS 4, ... RESUME ADDRESS. At ADDRESS 1, and OPCODE "LOAD" is stored as indicated in the middle column of the memory map of FIG. 4. The rightmost column shows the object code which corresponds to the OPCODE or OPERAND at a particular address. The LOAD OPCODE at ADDRESS 1 is and example of an OPCODE which is executable by bit processor 120. THe LOAD OPCODE is decoded by command decoder 126 in bit processor 120 and is recognized by bit processor 120 as being a Boolean OPCODE having argument of OPERAND following the OPCODE. The OPCODE and its OPERAND span two addresses. In this case, program counter 122 advances by 2 such that the instruction pointer is pointing to ADDRESS 3 after the Boolean data at cache RAM bit address A42 is loaded into the power flow register.

After bit processor 120 performs the above described LOAD operation, the instruction at ADDRESS 3 is decoded by command decoder 126. Bit processor recognizes the command at ADDRESS 3 as being a FUNC command or function block command which must be executed by function block processor 110. The function block command recognition is achieved by employing the scheme now described.

In actual practice the top bit of bit stack 123 is designated as the power flow register although a power flow register 124 has been diagrammatically shown separately in FIG. 2 for convenience. If the bit in power flow register 124 is a "1", then power flow is indicated whereas if the bit in the power flow resiter 124 is a "0" then no power flow is indicated. The command at ADDRESS 3 is a function block command having an OPCODE designated FUNC which corresponds to an object code representation "1000 bccc" wherein bits "1000" are designated as higher order bits IN7-IN4 and bits bccc are designated as lower order bits IN3-IN0. Bits IN7-IN4 represent the particular OPCODE. If bit IN3 (designated "b" in FIG. 4) is set to "1", then this indicates that the current OPCODE or command is a function block command that must always be executed and this will force function block processor 110 to execute that command as a function block command. In contrast, if bit IN3 is a "0", then processing of that command by function block processor 110 is only required if there is power flow in power flow register 124. The three bits designated bits IN2-IN0 contain the number of words or arguments associated with a particular OPCODE. Thus, bits IN2-IN0 indicates the number of words or arguments in user program RAM 135 which bit processor 120 should skip over to reach the RESUME ADDRESS when function block processor is done processing the function block instruction. In this example, the RESUME ADDRESS is an address containing the next OPCODE in RAM 135 after the last function block instruction. In this manner, the instruction pointer in bit processor 120 is at the proper point to resume execution of the user program after the bit processor 110 is finished processing a function block command.

While a programmable logic controller apparatus has been described above, it will be appreciated that a method for operation of a programmable logic controller has also been disclosed. The programmable logic controller employed in the method includes a function block processor for processing high level commands and a bit processor for processing low level commands. The bit processor is coupled to a user program memory containing a user program having a sequence of commands having OPCODES and OPERANDS associated therewith. The bit processor used in the method also includes a power flow register and a program counter containing an instruction pointer which points to the next command OPCODE to be processed. The method includes the step of the bit processor decoding and identifying the OPCODE of a command in the memory, such command being referred to as the current command. The method further includes the step of the bit processor returning control to the function block processor to process the current command if for the current command at least one of the following conditions is true: 1) there is power flow indicated in the power flow register 2) the current command is a function block which must be executed by the function block processor. The method also includes the step of the bit processor waiting until the function block processor has retrieved the instruction pointer from the bit processor and then adjusting the instruction pointer to point to the next OPCODE in the user program memory. The bit processor otherwise processes the current command if neither of the conditions 1 and 2 are true.

The foregoing describes a programmable logic controller apparatus and method which achieves high speed operation in a two processor programmable logic controller containing a function block processor and a bit processor. The programmable logic controller of the invention achieves this high speed operation while reducing undesired operational overhead. The programmable logic controller of the invention solves the earlier discussed problems and limitations associated with conventional programmable logic controllers.

While only certain preferred features of the invention have been shown by way of illustration, many modifications and changes will occur to those skilled in the art. It is, therefore, to be understood that the present claims are intended to cover all such modifications and changes which fall within the true spirit of the invention.

We claim:

1. A programmable logic controller comprising:
   a function block processor for processing high level commands;
   a bit processor, coupled to said function block processor, for processing low level commands, said bit processor being coupled to a user program memory containing a user program having a sequence of commands having OPCODES and OPERANDS associated therewith, said bit processor including a power flow register, said bit processor including a program counter containing an instruction pointer which points to a command OPCODE in user program memory to be processed;

said bit processor including decoding means for decoding the OPCODE of a command in said program memory, said command being referred to as the current command;

said bit processor including means for relinquishing control to said function block processor to processor said current command if for said current command at least one of the following conditions is true:
1. power flow is indicated in said power flow register;
2. said current command is a function block which must be executed by said function block processor;

said bit processor including instruction pointer adjusting means for waiting until said function block processor has retrieved the instruction pointer from the bit processor and then adjusting said instruction pointer to point to the next OPCODE in said program memory, said bit processor including means for causing said bit processor itself to process said current command if neither of said conditions 1 and 2 is true, said bit processor advancing said instruction pointer in such instance to point to the next OPCODE in said program memory.

2. The controller of claim 1 wherein said instruction pointer adjusting means includes means for incrementing said instruction pointer to point to the next valid OPCODE in said user program memory.

3. The controller of claim 1 wherein said function block processor includes means for executing the OPCODE of said current command when control is relinquished to said function block processor, said executing of said OPCODE of said current command occurring after said bit processor adjusts said instruction pointer.

4. The controller of claim 3 wherein said function block processor includes means for returning control to said bit processor after said function block processor executes the OPCODE of said current command.

5. In a programmable logic controller including a function block processor for processing high level commands and a bit processor for processing low level commands, said bit processor being coupled to a user program memory containing a user program having a sequence of commands having OPCODES and OPERANDS associated therewith, said bit processor including a power flow register, said bit processor including a program counter containing an instruction pointer which points to the next command OPCODE to be processed, a method comprising the steps of:

said bit processor decoding and identifying the OPCODE of a command in said memory, said command being referred to as the current command;

said bit processor returning control to said function block processor to process said current command if for said current command at least one of the following conditions is true;
1) there is power flow indicated in said power flow register;
2) said current command is a function block which must be executed by said function block processor;

said bit processor waiting until said function block processor has retrieved the instruction pointer from the bit processor and then adjusting said instruction pointer to point to the next OPCODE in said user program memory; and said bit processor otherwise processing said current command if neither of said conditions 1 and 2 are true.

6. The method of claim 5 wherein said waiting and adjusting step includes incrementing said instruction pointer to point to the next valid OPCODE.

7. The method of claim 5 wherein said waiting and adjusting step is followed by the step of said function block processor executing the OPCODE of said current command.

8. The method of claim 7 wherein said executing the OPCODE step is followed by the step of returning control to said bit processor.

* * * * *